G. L. WAITT.
Door-Hanger.
No. 215,697.        Patented May 20, 1879.
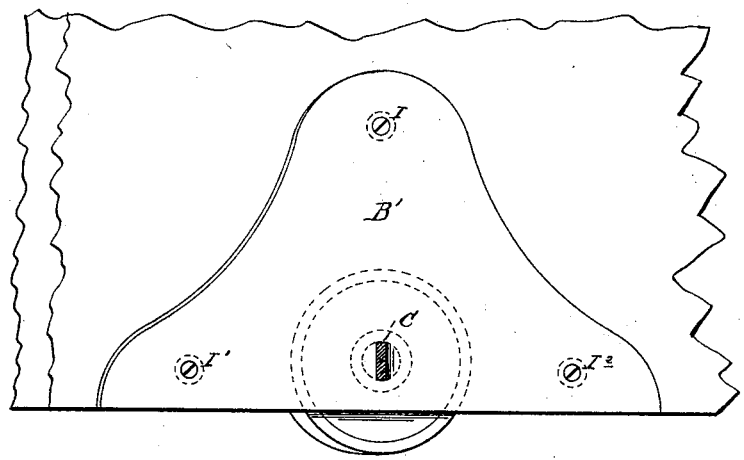
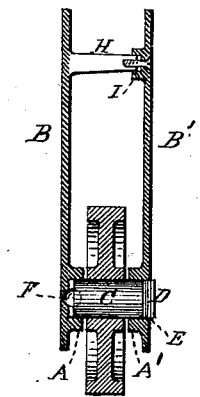
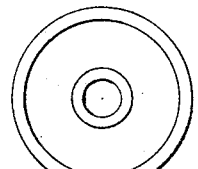
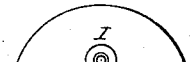

UNITED STATES PATENT OFFICE.

GEORGE L. WAITT, OF PHILADELPHIA, PENNSYLVANIA, ASSIGNOR TO SAMUEL L. GARRETT, OF SAME PLACE.

IMPROVEMENT IN DOOR-HANGERS.

Specification forming part of Letters Patent No. 215,697, dated May 20, 1879; application filed September 18, 1878.

*To all whom it may concern:*

Be it known that I, GEORGE L. WAITT, of the city and county of Philadelphia, and State of Pennsylvania, have invented a new and useful Improvement in Adjustable Axles for Car-Door Slides, which improvement is fully set forth in the following specification and accompanying drawings, in which—

Figure 1 is a side view of a carrying-plate secured to the lower part of a sliding door, with my adjustable axle applied to the anti-friction wheel. Fig. 2 is a vertical section of my invention. Figs. 3, 4, 5, 6, and 7 are views of the various parts of my invention, consisting of the carrying-plates, rubber ball, axle, and anti-friction wheel.

My invention consists in constructing the carrying-plates with suitable sockets on their inner sides, to receive the ends of axle of the wheel, and providing one of the said sockets with a gum ball or spring, which bears against the adjacent end of the axle and forces the opposite end into its respective socket. By this means the axle will expand or contract, according to the thickness of the door or distance of the plates apart, and remain at all times firmly within the sockets. The axle is also made with a rectangular-shaped projection on one end, which passes through a slot in one of the carrying-plates, so that the axle may be taken out to reverse the lower side as it becomes worn away.

A and A' are circular bosses on the inside of the carrying-plates B and B', in which sockets are formed to receive the ends of the axle C. D, Figs. 1, 2, and 5, is a rectangular projection formed on one end of the axle, which projects through a corresponding slot, E, Fig. 7, made in the plate B', to hold the axle in position, and also to allow it to be taken out and turned to change the wearing-surface.

F, Figs. 2 and 4, is a gum ball, placed in the socket of the boss A, with the end $c$ of the axle resting against it, the end of the axle and the bottom of the socket being made concave, to accommodate the ball.

In securing the carrying-plates to the door the gum ball compensates for the varying thicknesses of the wood.

H, $H^1$, and $H^2$ are tapering posts formed on the inside of the carrying-plate B, the ends of which fit into sockets I, $I^1$, and $I^2$, on the inside of the plate B', so that the two plates always come directly opposite one another when they are secured in position.

Post $H^2$ is not shown in the drawings, but is identical with H and $H^1$.

Having thus described my invention, what I claim as new, and desire to secure by Letters Patent, is—

1. The combination of the carrying-plates B and B', sockets A and A', gum ball F, and axle C, adapted to compensate for different thicknesses of doors, substantially as set forth.

2. The combination of the axle C, rectangular projection D, socket A', carrying-plates B and B', and rectangular opening E, substantially as set forth.

3. The combination of the carrying-plates B and B', sockets I, $I^1$, and $I^2$, tapering posts H, $H^1$, and $H^2$, axle C, sockets A and A', and gum ball F, operating as and for the purpose shown and described.

GEORGE L. WAITT.

Witnesses:
J. M. R. JERMON,
ISAAC R. OAKFORD.